(12) United States Patent
Okada et al.

(10) Patent No.: US 11,432,036 B2
(45) Date of Patent: Aug. 30, 2022

(54) DEMODULATION CIRCUIT, PROCESSING METHOD, AND PROCESSING DEVICE

(71) Applicant: SONY SEMICONDUCTOR SOLUTIONS CORPORATION, Kanagawa (JP)

(72) Inventors: Satoshi Okada, Kanagawa (JP); Ryosuke Suda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 54 days.

(21) Appl. No.: 17/250,147

(22) PCT Filed: Apr. 8, 2019

(86) PCT No.: PCT/JP2019/015260
§ 371 (c)(1),
(2) Date: Dec. 7, 2020

(87) PCT Pub. No.: WO2019/239695
PCT Pub. Date: Dec. 19, 2019

(65) Prior Publication Data
US 2021/0250642 A1 Aug. 12, 2021

(30) Foreign Application Priority Data
Jun. 13, 2018 (JP) .............................. JP2018-112837

(51) Int. Cl.
*H04N 7/173* (2011.01)
*H04N 21/438* (2011.01)
*H04L 1/00* (2006.01)

(52) U.S. Cl.
CPC ....... *H04N 21/4382* (2013.01); *H04L 1/0045* (2013.01); *H04L 1/0083* (2013.01)

(58) Field of Classification Search
CPC .. H04N 21/4382; H04L 1/0045; H04L 1/0083
See application file for complete search history.

(56) References Cited

U.S. PATENT DOCUMENTS 8,774,286 B2 * 7/2014 Yokokawa ......... H04N 21/4345
375/232
2007/0281757 A1 * 12/2007 Iguchi ................ H04N 21/4436
455/574

(Continued)

FOREIGN PATENT DOCUMENTS

CN 108292964 A 7/2018
EP 3422618 A1 1/2019

(Continued)

OTHER PUBLICATIONS

"ATSC Candidate Standard: Link-Layer Protocol (A/330)", Advanced Television Systems Committee, Document: S33-169r5, Jul. 5, 2016, 48 pages.

(Continued)

*Primary Examiner* — Mulugeta Mengesha
(74) *Attorney, Agent, or Firm* — Chip Law Group (57) ABSTRACT

[Problem] Provided is a demodulation circuit, a processing method, and a processing device which are capable of improving robustness in demodulating a broadcast signal. [Solution] Provided is a demodulation circuit including a demodulation unit that demodulates a broadcast signal received by a reception circuit that receives the broadcast signal, an error correction processing unit that performs an error correction on a first packet obtained by demodulation, and a packet processing unit that extracts a second packet from the first packet on which an error correction has been performed, in which when an error correction is unsuccessfully performed on the first packet that was to be processed immediately before, the packet processing unit extracts the (Continued)

second packet from the first packet to be processed based on pointer information included in the first packet to be processed.

17 Claims, 7 Drawing Sheets

(56) References Cited

U.S. PATENT DOCUMENTS

| | | | | |
|---|---|---|---|---|
| 2008/0098439 A1* | 4/2008 | Taura | ............... | H04N 21/4382 |
| | | | | 725/151 |
| 2016/0197826 A1* | 7/2016 | Yang | ............... | H04L 65/4084 |
| | | | | 370/392 |
| 2017/0346597 A1* | 11/2017 | Liao | ............... | H03M 13/154 |
| 2018/0352290 A1 | 12/2018 | Maruyama et al. | | |

FOREIGN PATENT DOCUMENTS

| | | |
|---|---|---|
| WO | 2017/090463 A1 | 6/2017 |
| WO | 2017/145790 A1 | 8/2017 |

OTHER PUBLICATIONS

International Search Report and Written Opinion of PCT Application No. PCT/JP2019/015260, dated Jun. 18, 2019, 09 pages of ISRWO.

* cited by examiner

DEMODULATION CIRCUIT, PROCESSING METHOD, AND PROCESSING DEVICE

CROSS REFERENCE TO RELATED APPLICATIONS

This application is a U.S. National Phase of International Patent Application No. PCT/JP2019/015260 filed on Apr. 8, 2019, which claims priority benefit of Japanese Patent Application No. JP 2018-112837 filed in the Japan Patent Office on Jun. 13, 2018. Each of the above-referenced applications is hereby incorporated herein by reference in its entirety.

FIELD

The present disclosure relates to a demodulation circuit, a processing method, and a processing device.

BACKGROUND

Broadcasting technology is being developed. An example of the above technology includes the standardized technology described in Non-Patent Literature 1 below.

CITATION LIST

Non Patent Literature

Non-Patent Literature 1: "ATSC Candidate Standard: Link-Layer Protocol (A/330)", Advanced Television Systems Committee, 5 Jul. 2016, the Internet (http://www.atsc.org/wp-content/uploads/2016/07/A330S33-169r5-A330-Link-Layer-Protocol.pdf)

SUMMARY

Technical Problem

A broadcast signal may be transmitted in a form in which a plurality of packets is included in one packet. For example, in the advanced television systems committee (ATSC) 3.0 standard described in Non-Patent Literature 1, a baseband packet (BBP) including a plurality of ATSC link-layer protocol (ALP) packets is transmitted. Hereinafter, for convenience of description, a packet that may include other packets such as the BBP may be referred to as a "transmission packet" (or "first packet"). Further, in the following, for convenience of description, a packet included in a transmission packet such as the ALP packet is referred to as a "data packet" (or "second packet").

Here, when the transmission packet includes a plurality of data packets, the device (or circuit) that performs demodulation extracts the data packet from the transmission packet. However, for example, when an error occurs in the transmission of a transmission packet, when the demodulation device misidentifies the packet boundary of the data packet in the transmission packet, there is a possibility that the data packet that cannot be operationally extracted may be extracted from the transmission packet. In addition, an error in identifying a packet boundary of a data packet in a transmission packet may affect the extraction of the data packet from the subsequent transmission packet.

The present disclosure proposes a new and improved demodulation circuit, a processing method, and a processing device which are capable of improving robustness in demodulating a broadcast signal.

Solution to Problem

According to the present disclosure, a demodulation circuit is provided. The demodulation circuit includes a demodulation unit that demodulates a broadcast signal received by a reception circuit that receives the broadcast signal, an error correction processing unit that performs an error correction on a first packet obtained by demodulation, and a packet processing unit that extracts a second packet from the first packet on which an error correction has been performed, wherein when an error correction is unsuccessfully performed on the first packet that was to be processed immediately before, the packet processing unit extracts the second packet from the first packet to be processed based on pointer information included in the first packet to be processed.

Moreover, according to the present disclosure, a processing method executed by a demodulation circuit is provided. The method includes a step of demodulating a broadcast signal received by a reception circuit that receives the broadcast signal, a step of performing an error correction on a first packet obtained by demodulation, and a step of extracting a second packet from the first packet on which an error correction has been performed, wherein in the extracting step, when an error correction is unsuccessfully performed on the first packet that was to be processed immediately before, the second packet is extracted from the first packet to be processed based on pointer information included in the first packet to be processed.

Moreover, according to the present disclosure, a processing device is provided. The processing device includes a reception circuit that receives a broadcast signal, a demodulation circuit electrically connected to the reception circuit, and a processing circuit electrically connected to the demodulation circuit, wherein the demodulation circuit includes a demodulation unit that demodulates the broadcast signal received by the reception circuit, an error correction processing unit that performs an error correction on a first packet obtained by demodulation, and a packet processing unit that extracts a second packet from the first packet on which an error correction has been performed, and when an error correction is unsuccessfully performed on the first packet that was to be processed immediately before, the packet processing unit extracts the second packet from the first packet to be processed based on pointer information included in the first packet to be processed.

Advantageous Effects of Invention

According to the present disclosure, robustness in demodulating a broadcast signal can be improved.

Note that the above-described effect is not necessarily restrictive, and any one of effects described in the present specification or any another effect obtainable from the present specification may be exhibited in addition to or in place of the above-described effect.

DESCRIPTION OF EMBODIMENTS

Hereinafter, preferred embodiments of the present disclosure will be described in detail with reference to the accompanying drawings. Note that, in the present specification and drawings, redundant description of a configuration element having substantially the same functional configuration is omitted by providing the same sign.

Also, in the following, the description will be given in the order shown below.

1. Processing device according to the present embodiment, and processing method according to the present embodiment

[1] Configuration of processing device according to the present embodiment

[2] An example of effects exhibited by using the processing method according to the present embodiment

[3] An application example of the processing device according to the present embodiment 2. Program according to the embodiment Processing Device According to the Present Embodiment, and Processing Method According to the Present Embodiment The processing device according to the present embodiment is a device capable of processing a received broadcast signal.

For example, as in the case where the ATSC 3.0 standard described in Non-Patent Literature 1 is used, a broadcast signal may be transmitted in a form in which a plurality of data packets is included in one transmission packet. When processing a broadcast signal as described above, the processing device according to the present embodiment extracts a data packet from a transmission packet obtained by demodulating the broadcast signal to process the extracted data packet.

Hereinafter, the configuration of the processing device according to the present embodiment, and the processing method according to the present embodiment will be described by mainly taking, as an example, the case in which the processing device according to the present embodiment processes a broadcast signal conforming to the ATSC 3.0 standard. The processing method according to the present embodiment described below is not limited to be applied to the ATSC 3.0 standard, but is applied to any standards capable of transmitting a plurality of data packets with one transmission packet. In addition, the processing method according to the present embodiment described below can be applied to the process of any broadcast signals that can be transmitted in a form in which a plurality of data packets is included in one transmission packet regardless of the presence or absence of standardization. Hereinafter, the process related to the processing method according to the present embodiment may be simply referred to as a "process related to the processing method".

[1] Configuration of Processing Device According to the Present Embodiment

Figure 1:
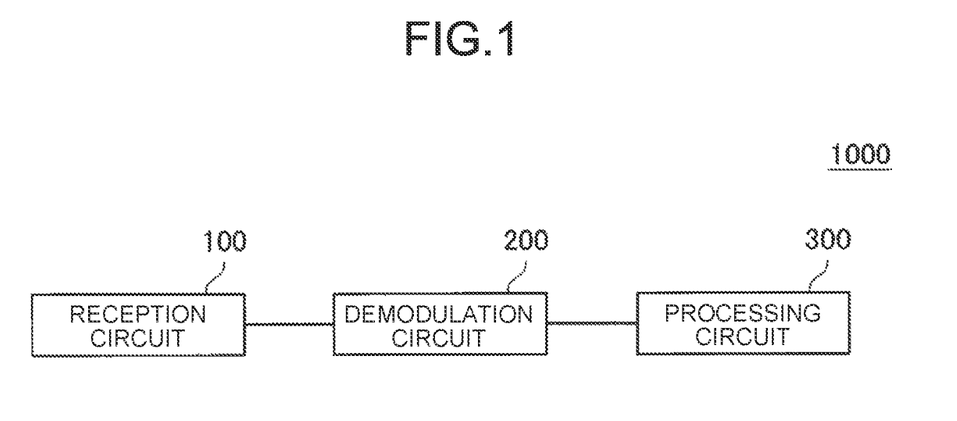
FIG. 1 is a block diagram illustrating an example of a configuration of the information processing device according to the present embodiment.

FIG. 1 is a block diagram illustrating an example of a configuration of a processing device 1000 according to the present embodiment. The processing device 1000 includes, for example, a reception circuit 100, a demodulation circuit 200, and a processing circuit 300. "The reception circuit 100 and the demodulation circuit 200" are electrically connected by one or more wires, and "the demodulation circuit 200 and the processing circuit 300" are electrically connected by one or more wires, and various signals (analog signal or digital signal) are transmitted between circuits.

The reception circuit 100 receives a broadcast signal.

The demodulation circuit 200 demodulates the broadcast signal received by the reception circuit 100. In addition, the demodulation circuit 200 extracts a data packet (second packet) from a transmission packet (first packet) obtained by demodulating the broadcast signal by performing a process according to a processing method described later.

The processing circuit 300 processes the broadcast signal demodulated by the demodulation circuit 200, that is, the data string of the data packet extracted by the demodulation circuit 200 (hereinafter may be referred to as a "packet train"). As an example of the process on the demodulated broadcast signal, examples of the process include any processes that can be performed on the demodulated broadcast signal such as a display control process of displaying an image on the display screen of a display device, and an audio output process of outputting audio from an audio output device.

The processing device 1000 has, for example, the configuration illustrated in FIG. 1 to demodulate the received broadcast signal and process the demodulated broadcast signal.

The configuration of the processing device according to the present embodiment is not limited to that of the example illustrated in FIG. 1.

For example, when electrically connected to an external reception circuit having the same function and configuration as the reception circuit 100, the processing device according to the present embodiment is not required to include the reception circuit 100 illustrated in FIG. 1.

Further, for example, the demodulation circuit 200 illustrated in FIG. 1 may include part or all of the configuration of the reception circuit 100. An example of the configuration of the demodulation circuit 200 including part of the configuration of the reception circuit 100 includes a "configuration in which the demodulation circuit 200 is connected to an external antenna (an example of part of the configuration of the reception circuit 100)". The demodulation circuit 200 connected to an external antenna processes the broadcast signal received by the antenna.

Further, the processing device according to the present embodiment may include, for example, part or all of a processor (not illustrated), a read only memory (ROM not illustrated), a random access memory (RAM not illustrated), a recording medium (not illustrated), a display device (not illustrated), an audio output device (not illustrated), an operation device (not illustrated), and a communication device (not illustrated). Further, the processing device according to the present embodiment can have a configuration according to an application example of the processing device according to the present embodiment described later.

The processor (not illustrated) is composed of, for example, an arithmetic circuit such as a micro processing unit (MPU) and has a function of controlling the entire processing device according to the present embodiment. In the processing device 1000 illustrated in FIG. 1, for example, the processing circuit 300 may serve as a processor (not illustrated).

The ROM (not illustrated) stores control data such as a program and a calculation parameter used by the processor (not illustrated). The RAM (not illustrated) temporarily stores a program executed by a processor (not illustrated).

The recording medium (not illustrated) is a storage unit included in the processing device according to the present embodiment, and stores various pieces of data such as data related to the processing method in the demodulation circuit 200, for example. Here, examples of the recording medium (not illustrated) include a non-volatile memory and the like such as a flash memory. The processing device according to the present embodiment does not include a recording medium (not illustrated), and various pieces of data such as data related to the processing method according to the present embodiment may be stored in a recording medium external to the processing device according to the present embodiment.

A display device (not illustrated) displays various images such as images related to a user interface (UI) on the display screen. Examples of the display device (not illustrated) include a liquid crystal display and an organic EL display. Further, the display device may be a device, such as a touch panel, that can perform display and allows an operation.

The audio output device (not illustrated) outputs various sounds such as the sound (including music) indicated by the broadcast signal. An example of the audio output device (not illustrated) includes a speaker.

The operation device (not illustrated) is a device that can be operated by the user of the processing device according to the present embodiment. Examples of the operation device (not illustrated) include buttons, direction keys, a rotary selector such as a jog dial, and a combination thereof.

The communication device (not illustrated) is a communication unit included in the processing device according to the present embodiment, and serves to perform wireless or wired communication with an external device. Here, examples of the communication device (not illustrated) include, for example, a communication antenna and a radio frequency (RF) circuit (wireless communication), an IEEE 802.15.1 port and a transmission/reception circuit (wireless communication), an IEEE 802.11 port and a transmission/reception circuit (wireless communication), a local area network (LAN) terminal and a transmission/reception circuit (wired communication), and the like.

Hereinafter, an example of the configuration of the processing device according to the present embodiment and the process in each circuit included in the processing device according to the present embodiment will be described by taking the processing device 1000 illustrated in FIG. 1 as an example.

Further, in the following, the case where the broadcast signal is a signal conforming to the ATSC 3.0 standard will be described as an example. As described above, it goes without saying that the broadcast signal that can be processed by the processing device according to the present embodiment is not limited to the broadcast signal conforming to the ATSC 3.0 standard.

[1-1] Reception Circuit 100

The reception circuit 100 is a circuit (or a circuit group) having a function of receiving a broadcast signal.

As an example, the reception circuit 100 includes, for example, an antenna (not illustrated), a first filter (not illustrated), an amplifier (not illustrated), a mixer (not illustrated), and a second filter (not illustrated).

The antenna (not illustrated) is composed of an antenna of any configuration such as a dipole antenna, a monopole antenna, a chip antenna, or a pattern antenna, and receives a radio wave carrying a broadcast signal. The first filter (not illustrated) is composed of any filter such as a low-pass filter or a band-pass filter, and removes unnecessary frequency components from the signal received by the antenna (not illustrated). The amplifier (not illustrated) is composed of any amplifier such as a low noise amplifier (LNA) and amplifies the signal transmitted from the first filter (not illustrated). A signal transmitted from an amplifier (not illustrated) and a signal of a predetermined frequency generated by an oscillator (not illustrated) or the like is input to the mixer (not illustrated), and the mixer (not illustrated) converts the signal transmitted from the amplifier (not illustrated) into an intermediate frequency (IF) signal. The second filter (not illustrated) is composed of any filter such as a band-pass filter or a low-pass filter, and removes unnecessary frequency components from the IF signal. The signal output from the second filter (not illustrated) corresponds to the broadcast signal (modulated signal modulated by a predetermined method) received by the reception circuit 100.

The configuration of the reception circuit 100 is not limited to that of the example shown above. The reception circuit 100 can have any configuration capable of receiving a broadcast signal transmitted by radio waves, for example.

[1-2] Demodulation Circuit 200

The demodulation circuit 200 is a circuit (or a circuit group) having a function of demodulating a broadcast signal received by the reception circuit 100. The demodulation circuit 200 extracts a data packet (second packet) from a transmission packet (first packet) obtained by demodulating a broadcast signal by performing the process related to the processing method.

Figure 2:
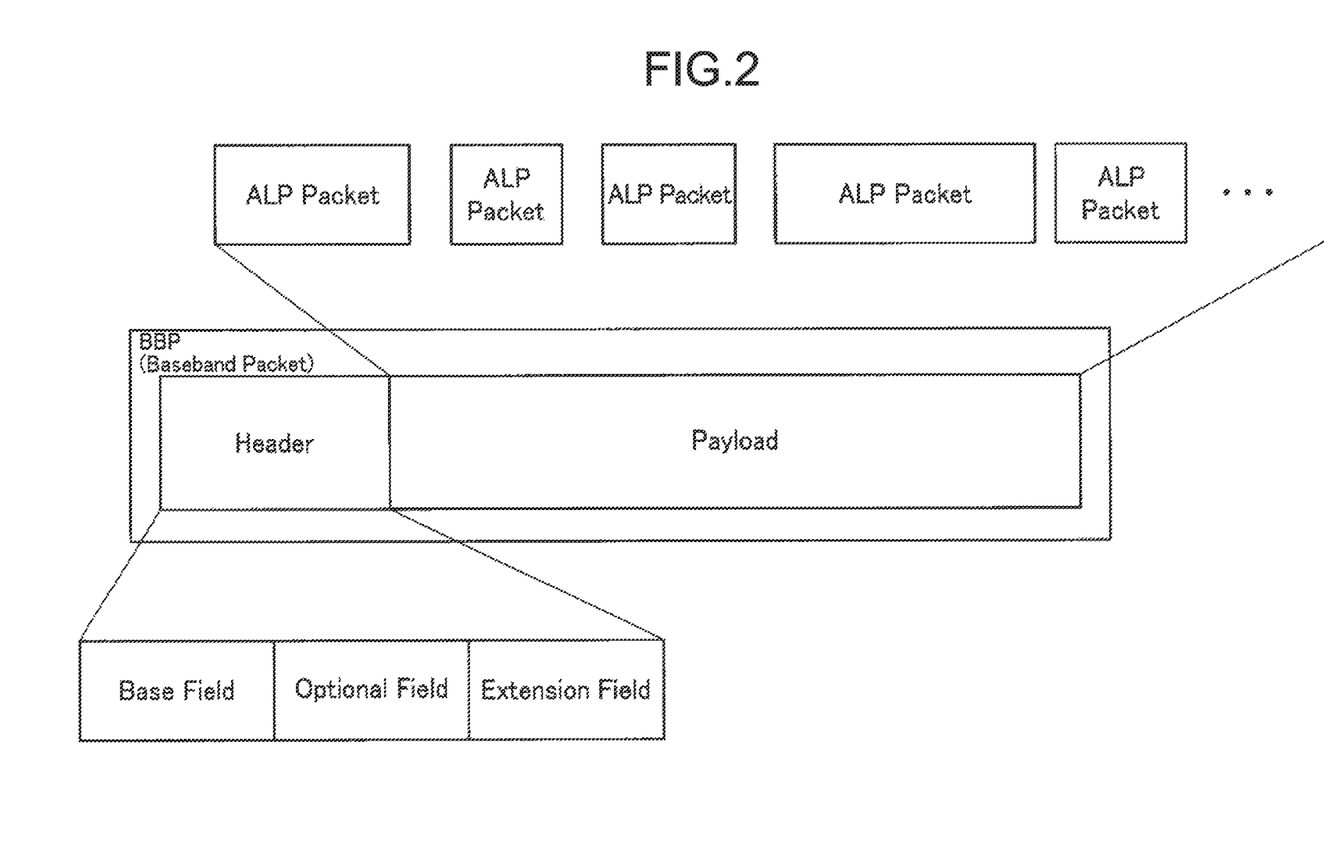
FIG. 2 is an explanatory diagram illustrating an example of a transmission packet (first packet) and a data packet (second packet) according to the present embodiment.

FIG. 2 is an explanatory diagram illustrating an example of a transmission packet (first packet) and a data packet (second packet) according to the present embodiment. FIG. 2 illustrates a BBP structure including a plurality of ALP packets defined in the ATSC 3.0 standard. When the processing device 1000 processes a broadcast signal conforming to the ATSC 3.0 standard, the BBP corresponds to the transmission packet (first packet), and the ALP packet corresponds to the data packet (second packet) (the same applies hereinafter).

As illustrated in FIG. 2, the BBP has a header part ("Header" indicated in FIG. 2) and a payload part ("Payload" indicated in FIG. 2), and the payload part includes a plurality of ALP packets. The ALP packet is a variable-length packet that can have different data lengths, as indicated by the rectangular size in FIG. 2. Further, each ALP packet indicated in FIG. 2 is the first located ALP packet, the second located ALP packet . . . .

Pointer information is stored in the header part of the BBP. The pointer information according to the present embodiment is data indicating the position of the packet boundary of the first located ALP included in the BBP, and the start position of the first located ALP packet is defined by the pointer information. The data length of the ALP packet is stored in the header of the ALP packet.

An example of the process of extracting the ALP packet from the BBP will be described. The demodulation circuit 200 identifies the start position and the data length of the first located ALP packet based on the pointer information acquired from the BBP to extract the first located ALP packet. Further, the demodulation circuit 200 identifies the start position and the data length of the second located ALP packet based on the start position and the data length of the first located ALP packet to extract the second located ALP packet. Hereinafter, similarly, the demodulation circuit 200 identifies, every time the start position and the data length of the ALP packet are identified, the start position and the data length of the next ALP packet to extract the ALP packet corresponding to the identified start position and the data length.

For example, as in the above-described example, the demodulation circuit 200 can extract the ALP packet, which is a variable-length packet, from the BBP by identifying the start position and the data length of the ALP packet.

The method of extracting the data packet in the demodulation circuit 200 is not limited to that of the above example.

For example, in broadcasting standards such as DVB-T2, DVB-S2, and ISDB-T, a packet with a fixed data length, which is called a moving picture experts group 2-transport stream (MPEG2-TS), is used. Specifically, the data length of MPEG2-TS is 188 [Byte].

When the data packet is a fixed-length packet as described above, the demodulation circuit 200 may extract the data packet according to the fixed data length after identifying the start position of the first located data packet.

The function of the demodulation circuit 200 is not limited to that of the above example.

As described above, the demodulation circuit 200 may include part or all of the configuration of the reception circuit 100. That is, in the processing device according to the present embodiment, the demodulation circuit 200 illustrated in FIG. 1 can further have part or all of the functions of the reception circuit 100 illustrated in FIG. 1. When the demodulation circuit 200 further has part or all of the functions of the reception circuit 100, part or all of the configuration of the reception circuit 100 included in the demodulation circuit 200 functions as a reception unit in the demodulation circuit 200.

An examples of the demodulation circuit 200 includes an "integrated circuit (IC) chip that includes one or more processors and in which various circuits for realizing the functions of the demodulation circuit 200 are integrated". It goes without saying that the demodulation circuit 200 does not have to be realized in the form of an IC chip.

The functions of the demodulation circuit 200 will be described below. In the following, among the functions of the demodulation circuit 200, the function of performing the process related to the processing method will be mainly described.

Figure 3:
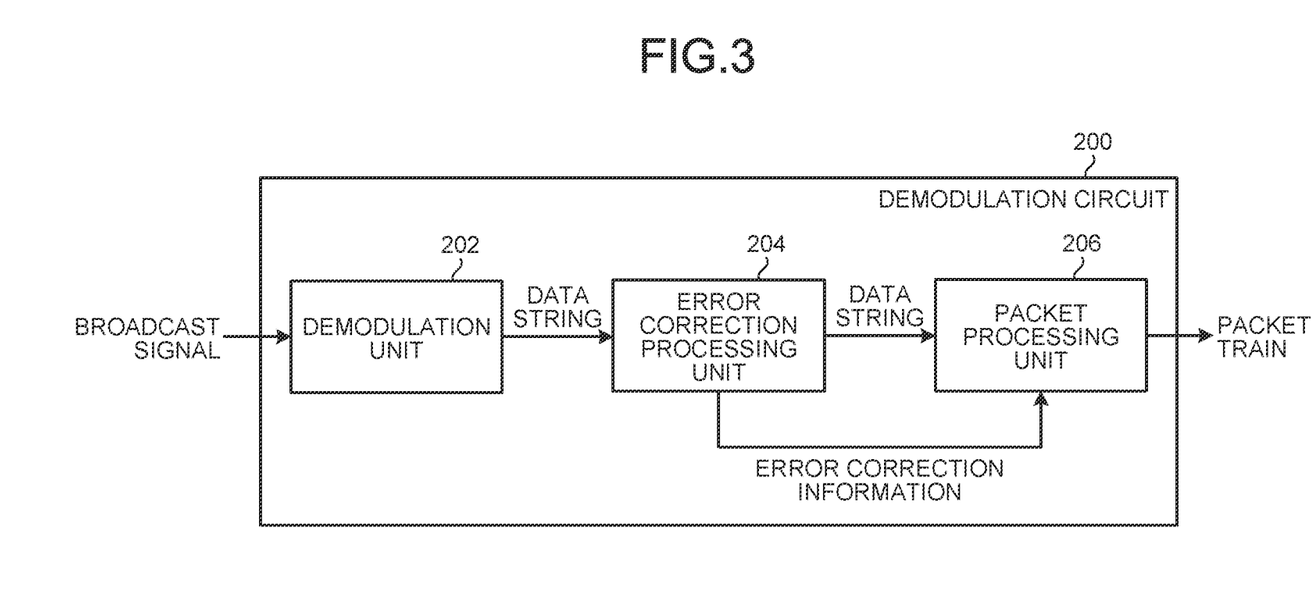
FIG. 3 is a functional block diagram illustrating an example of a configuration of a demodulation circuit included in the processing device according to the present embodiment.

FIG. 3 is a functional block diagram illustrating an example of the configuration of the demodulation circuit 200 included in the processing device 1000 according to the present embodiment. The demodulation circuit 200 includes, for example, a demodulation unit 202, an error correction processing unit 204, and a packet processing unit 206. Note that the functional blocks of the demodulation circuit 200 illustrated in FIG. 3 are obtained by dividing the function of the demodulation circuit 200 for convenience, and the functional block diagram of the demodulation circuit 200 is not limited to that of the example illustrated in FIG. 3.

[1-2-1] Demodulation Unit 202

The demodulation unit 202 demodulates the broadcast signal received by the reception circuit 100. The demodulation unit 202 demodulates the broadcast signal by a demodulation method corresponding to the modulation method of the broadcast signal. Then, demodulation unit 202 transmits the BBP (an example of the transmission packet, that is, an example of the first packet, the same applies hereinafter) obtained as a result of demodulation to the error correction processing unit 204. In FIG. 3, the BBP transmitted from the demodulation unit 202 to the error correction processing unit 204 is indicated as a "data string".

[1-2-2] Error Correction Processing Unit 204

The error correction processing unit 204 performs error correction on the BBP transmitted from the demodulation unit 202, that is, the BBP obtained by demodulation. The error correction processing unit 204 performs error correction on each BBP by a method defined in a corresponding standard such as a method defined in the ATSC 3.0 standard. The error correction processing unit 204 can perform error correction on each BBP by a process according to any method capable of realizing error correction, such as a method using an error correction code.

Then, the error correction processing unit 204 transmits the BBP on which the error correction has been performed to the packet processing unit 206. In FIG. 3, the BBP transmitted from the error correction processing unit 204 to the packet processing unit 206 is indicated as a "data string".

Further, the error correction processing unit 204 transmits the error correction information indicating the result of error correction to the packet processing unit 206 for each BBP on which the error correction has been performed. The error correction information according to the present embodiment includes, for example, "a flag indicating whether the error correction is successfully performed or the error correction is unsuccessfully performed". The error correction information is not limited to the flag and may be data of any format capable of indicating that the error correction is successfully performed or that the error correction is unsuccessfully performed.

An example of the case where the error correction information indicates that the error correction is unsuccessfully performed includes a case where an error occurs in the transmission of the BBP due to some cause and the process is performed on the BBP having the error.

[1-2-3] Packet Processing Unit 206

The packet processing unit 206 extracts an ALP packet (an example of a data packet, that is, an example of a second packet, the same applies hereinafter) from the BBP on which the error correction has been performed which is transmitted from the error correction processing unit 204. The packet processing unit 206 extracts the ALP packet from the BBP, as shown in an example of the process of extracting the ALP packet from the BBP described above. Then, the packet processing unit 206 transmits the extracted ALP packet to the processing circuit 300. In FIG. 3, the ALP packet transmitted from the packet processing unit 206 to the processing circuit 300 is indicated as a packet train.

Specifically, the packet processing unit 206 performs, for example, based on the error correction information transmitted from the error correction processing unit 204, any one of, for example, the process according to the first example shown in (1) to the process according to the sixth example shown in (6) shown below.

(1) FIRST EXAMPLE OF PROCESSING IN PACKET PROCESSING UNIT 206

When the error correction information indicates that the error correction is unsuccessfully performed, the BBP transmitted from the error correction processing unit 204 is not normal data. When the process of extracting the ALP packet from the BBP is performed on the BBP that is not normal data, the packet processing unit 206 may erroneously identify the ALP packet boundary.

As described above, when the packet boundary is erroneously identified, there is a possibility that an ALP packet that cannot be operationally extracted is extracted from the BBP. Further, as described above, the occurrence of an error in identifying the packet boundary of the ALP packet in BBP may affect the extraction of the ALP packet from the subsequent BBP.

Figure 4A:
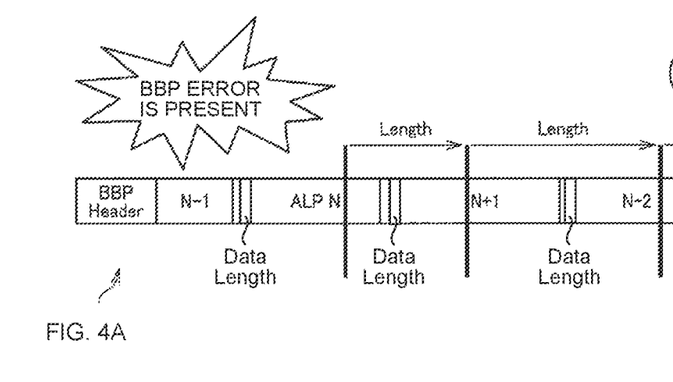
FIGS. 4A and 4B are explanatory diagrams illustrating an example of a process of extracting an ALP packet from a BBP.
Figure 4B:
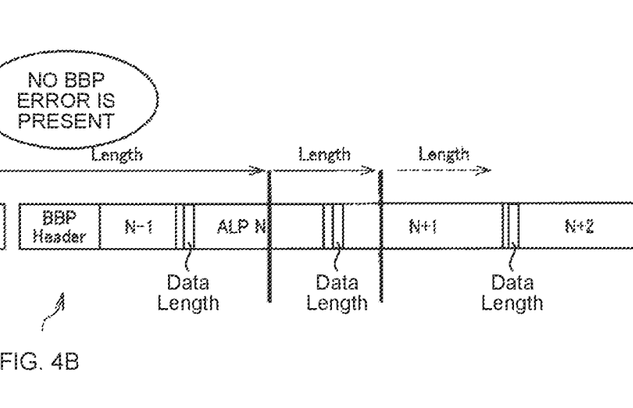

FIGS. 4A and 4B are explanatory diagrams illustrating an example of the process of extracting the ALP packet from the BBP, and illustrates an example of the process when the process related to the processing method is not performed. In FIGS. 4A and 4B, the data length of the ALP packet extracted from the BBP is indicated as a "Length".

In BBP that is not normal data, the start position of the first located ALP packet indicated by the pointer information included in the header may be incorrect. Since the ALP packet is a variable-length packet, it is difficult to identify a correct packet boundary once the packet boundary is identified incorrectly. Therefore, as in the example illustrated in FIGS. 4A and 4B, when extracting an ALP packet from a BBP that is not normal data (BBP indicated in FIG. 4A), there is a possibility that the ALP packet will be extracted in a state where the packet boundary is incorrect. Also, as in the example indicated in FIGS. 4A and 4B, when an ALP packet is extracted from a BBP that is not normal data (BBP indicated in FIG. 4A), the ALP packets may be extracted, in a state where the packet boundary is incorrect, also from a BBP (BBP indicated in FIG. 4B) which is normal data to be processed next. That is, in the example of the process illustrated in FIGS. 4A and 4B, it is not possible to recover from the error of the process of extracting the ALP packet from the BBP.

Therefore, for example, as illustrated in FIGS. 4A and 4B, when the ALP packets are continuously extracted in a state where the packet boundary is incorrect, there is a possibility that the ALP packets that cannot be operationally extracted continue to be extracted from the BBP.

Therefore, when the error correction for the BBP that was to be processed immediately before is unsuccessfully performed, the packet processing unit 206 extracts, from the BBP to be processed, the ALP packet based on the pointer information included in the BBP to be processed. That is, the packet processing unit 206 prioritizes the pointer information included in the BBP over the information of the data length of the ALP packet, and identifies the packet boundary to extract the ALP packet.

As described above, by extracting the ALP packet based on the pointer information included in the BBP to be processed, the packet processing unit 206 is not affected by an error of the BBP that was to be processed immediately before. Therefore, the packet processing unit 206 can recover from the error even when the error occurs in the process of extracting the ALP packet from the BBP.

Figure 5A:
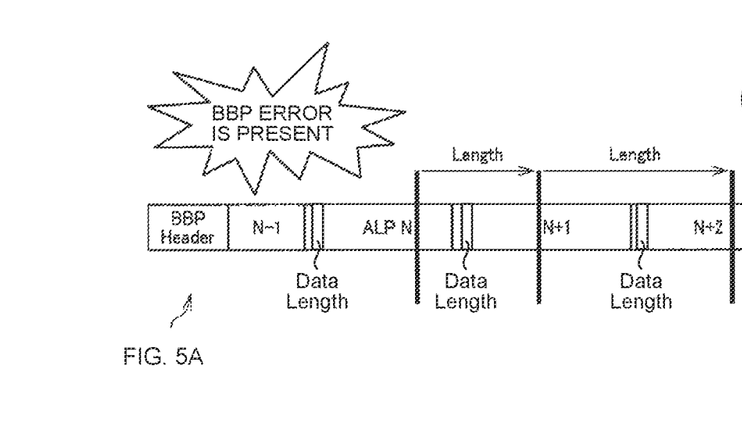
FIGS. 5A and 5B are explanatory diagrams illustrating another example of a process of extracting an ALP packet from a BBP.
Figure 5B:
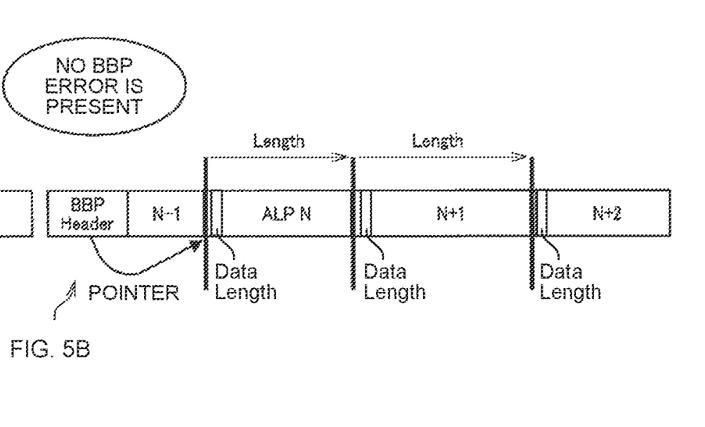

FIGS. 5A and 5B are explanatory diagrams illustrating another example of the process of extracting the ALP packet from the BBP, and illustrates an example of the process when the process related to the processing method is performed. In FIGS. 5A and 5B, as in FIGS. 4A and 4B, the data length of the ALP packet extracted from the BBP is shown as the "Length".

When extracting an ALP packet from a BBP that is not normal data (BBP indicated in A of FIG. 5A), as explained with reference to FIGS. 4A and 4B, the packet processing unit 206 may extract, in a state where the packet boundary is incorrect, the ALP packet from the BBP that is not normal data.

However, the packet processing unit 206 extracts, from the BBP (BBP indicated in FIG. 5B) that is the normal data to be processed next, the first located ALP packet based on the pointer information included in the BBP header as indicated by a "pointer" in FIG. 5B. Therefore, since the normal packet boundary of the ALP packet is identified from the BBP that is normal data, the packet processing unit 206 can normally extract the ALP packet from the BBP indicated in FIG. 5B.

As illustrated in FIGS. 5A and 5B, the packet processing unit 206 that performs the process according to the first example can recover from the error even when the error occurs in the process of extracting the ALP packet from the BBP.

Therefore, the demodulation circuit 200 including the packet processing unit 206 that performs the process according to the first example can improve robustness in demodulating the broadcast signal.

The example of the process according to the first example in the packet processing unit 206 is not limited to the example shown with reference to FIGS. 5A and 5B.

For example, when the data length identified for the ALP packet is not within a set range, the packet processing unit 206 may correct the identified data length to a data length within the range. When the identified data length is not within the set range means when the identified data length is smaller than the set range, or when the identified data length is larger than the set range.

An example of the data length range according to the present embodiment includes a preset fixed range. The fixed range includes, for example, "a range equal to or more than the lower limit value of the data length that hardly exists in the standard or operation and less than or equal to the upper limit value of the data length that hardly exists in the standard or operation".

When the identified data length is not within the set range, the packet processing unit 206 corrects, for example, the identified data length to a data length corresponding to the learning result of the data length of the ALP packet extracted from the BBP on which the error correction is successfully performed. An example of learning of the data length of ALP packet includes learning using a neural network capable of handling time series data, such as a recurrent neural network (RNN), which is a type of a deep neural network. An example of simple correction includes "the packet processing unit 206 correcting the identified data length to the most used data length among the data lengths of ALP packets extracted from BBP on which the error correction was successfully performed in the past".

The process of correcting the identified data length to a data length within the range is not limited to that of the above example. For example, the packet processing unit 206 may correct the identified data length to a data length selected by any algorithm capable of making the corrected data length within the range, such as a data length randomly selected from within the range.

(2) SECOND EXAMPLE OF PROCESSING IN PACKET PROCESSING UNIT 206

Next, an example of the process for the BBP when the error correction information indicates that the error correction is unsuccessfully performed, that is, the process when the BBP on which the error correction is unsuccessfully performed is to be processed is described. As described above, when the error correction information indicates that the error correction is unsuccessfully performed, the BBP transmitted from the error correction processing unit 204 is not normal data. Therefore, when the BBP on which the error correction is unsuccessfully performed is to be processed, the ALP packet may be extracted in a state where the packet boundary is incorrect.

Therefore, the packet processing unit 206 selectively changes the type based on the type indicated by the extracted ALP packet and the set change condition. Specifically, the packet processing unit 206 changes the type indicated by the ALP packet when the type indicated by the extracted ALP packet satisfies the change condition. Further, the packet processing unit 206 does not change the type indicated by the ALP packet when the type indicated by the extracted ALP packet does not satisfy the change condition.

Figure 6A:
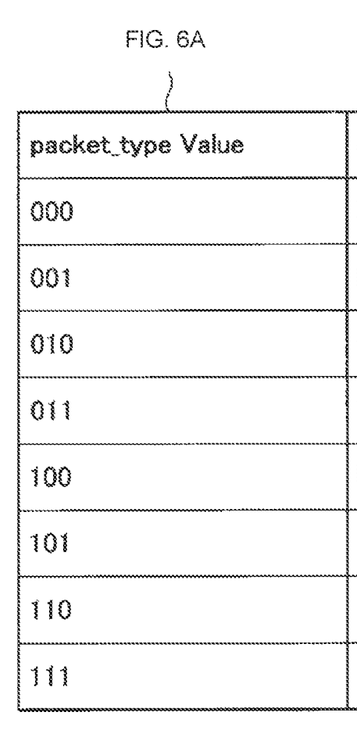
FIGS. 6A and 6B are explanatory diagrams illustrating types indicated by ALP packets in the ATSC 3.0 standard.
Figure 6B:
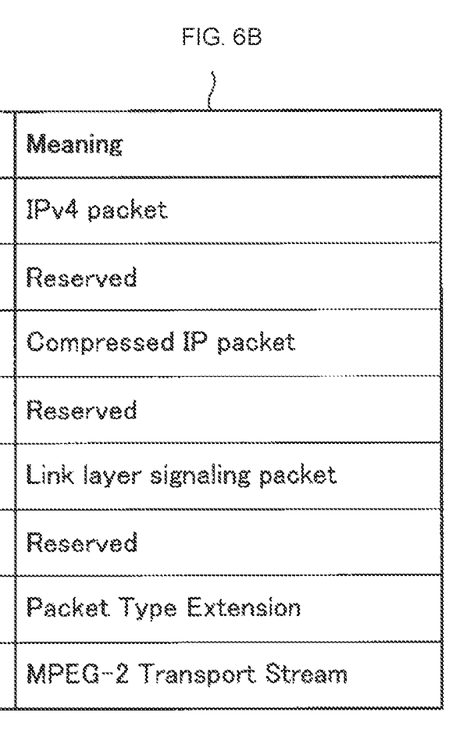

FIGS. 6A and 6B are explanatory diagrams illustrating the type indicated by ALP packets in the ATSC 3.0 standard. A indicated in FIGS. 6A and 6B show a list of values indicating the type of the ALP packet stored in the header part of the ALP packet. Further, FIG. 6B shows the content of the type indicated by each value indicated in FIG. 6A.

The packet processing unit 206 reads the data of the part corresponding to the header from the extracted ALP packet, and identifies the type of the ALP packet based on the value of the read data. The packet processing unit 206 refers to, for example, a "table in which types and contents are associated with each other (for example, a table indicated in FIGS. 6A and 6B)" stored in a recording medium (not illustrated) included in the processing device 1000 to identify the type of ALP packet.

Examples of change conditions according to the present embodiment include the following examples. The example of the change condition is not limited to the example shown below, and can be optionally set by the designer of the processing device 1000 (or the designer of the demodulation circuit 200) and the like.

When the type is "Reserved"
When the type is "MPEG-2 Transport Stream"
When the type is "Reserved" or "MPEG-2 Transport Stream"

When the type indicated by the extracted ALP packet satisfies the change condition, the packet processing unit 206 changes the type indicated by the ALP packet to a preset type such as the "IPv4 packet", for example. The packet processing unit 206 rewrites, for example, the data of the part corresponding to the header from the extracted ALP packet to a value corresponding to the preset type to change the type indicated by the ALP packet. Changing the type of the ALP packet corresponds to changing part of the header of the ALP packet.

The process when the type indicated by the extracted ALP packet satisfies the change condition is not limited to that of the above example. For example, the packet processing unit 206 may change the type indicated by the ALP packet to a type corresponding to the learning result of the type indicated by the ALP packet extracted from the BBP on which the error correction is successfully performed. An examples of learning of the type of ALP packet include learning using a neural network capable of handling time series data such as the RNN. An example of simple correction includes "the packet processing unit 206 changing the type indicated by the ALP packet to the most used type among the types indicated by the ALP packet extracted from the BBP on which the error correction was successfully performed in the past".

For example, as above the packet processing unit 206 changes the type indicated by the ALP packet when the type indicated by the extracted ALP packet satisfies the change condition, so that it is possible to prevent the demodulation circuit 200 from outputting the ALP packet that cannot be operationally extracted.

The example of the process according to the second example in the packet processing unit 206 is not limited to the above example.

For example, when the type indicated by the extracted ALP packet satisfies the change condition, the packet processing unit 206 may change the entire header of the ALP packet. For example, as in the case of changing the type indicated by the ALP packet, the packet processing unit 206 "rewrites the data of the part corresponding to the header of the ALP packet to a preset value" or "rewrites the data to the value corresponding to the learning result" to change the entire header of the ALP packet.

For example, as above, the packet processing unit 206 changes the header of the ALP packet when the type indicated by the extracted ALP packet satisfies the change condition, so that it is possible to prevent the demodulation circuit 200 from outputting the ALP packet that cannot be operationally extracted.

Further, for example, the packet processing unit 206 may use an ALP packet whose type has been changed as a packet having a data length corresponding to the changed type. Here, the ALP packet whose type has been changed includes the "ALP packet whose type has been changed only in the header" and the "ALP packet whose type has been changed as a result of changing the entire header". The packet processing unit 206 corrects the data length of the ALP packet whose type has been changed to the data length corresponding to the changed type. The packet processing unit 206 corrects the data length corresponding to the type based on the learning result of the data length and the like, as in the correction of the data length according to the first example shown in (1) above.

As described above, the ALP packet whose type has been changed can be more reliably set as an ALP packet that does not violate the standard by correcting the data length of the ALP packet whose type has been changed to the data length corresponding to the changed type.

(3) THIRD EXAMPLE OF PROCESSING IN PACKET PROCESSING UNIT 206

The example of the process when the BBP on which the error correction is unsuccessfully performed is to be processed is not limited to the process according to the second example shown in (2) above.

For example, the packet processing unit 206 changes the type indicated by the extracted ALP packet to a predetermined type. That is, in the process according to the third example, the type indicated by the ALP packet is changed to a predetermined type without depending on the change condition as in the process according to the second example shown in (2) above. The packet processing unit 206 rewrites, for example, the data of the part corresponding to the header from the extracted ALP packet to a value corresponding to the predetermined type to change the type indicated by the ALP packet to a predetermined type.

An examples of the predetermined type according to the third example includes "Reserved" indicated in FIGS. 6A and 6B. When the ATSC 3.0 standard is used, the packet processing unit 206 may change the type indicated by the extracted ALP packet to a type, such as "MPEG-2 Transport Stream", which cannot be operationally extracted (another example of the predetermined type). For example, the type indicated by the ALP packet can be used as a flag for error transmission by changing the type indicated by the extracted ALP packet to a type which cannot be operationally extracted.

For example, as above, by changing the type indicated by the extracted ALP packet by the packet processing unit 206 to a predetermined type, the demodulation circuit 200 can inform the subsequent circuit such as the processing circuit 300 that "the ALP packet is an error packet" (or "the ALP packet is an ALP packet obtained from the BBP that is not normal data").

(4) FOURTH EXAMPLE OF PROCESSING IN PACKET PROCESSING UNIT 206

The example of the process in the case where the BBP on which the error correction is unsuccessfully performed is to be processed is limited to the process according to the second example shown in (2) above and the process according to the third example shown in (3) above.

For example, the packet processing unit 206 can correct the packet length of the ALP packet that is finally extracted in the BBP on which the error correction is unsuccessfully performed based on the start position of the ALP packet included in the BBP to be processed next. The start position of the ALP packet included in the BBP to be processed next is identified based on the pointer information of the BBP, as in the process according to the first example shown in (1) above.

Specifically, "when extracting the ALP packet from the BBP on which the error correction is unsuccessfully performed, after that, when the packet boundary indicated by the pointer information included in the BBP on which the error correction is successfully performed is identified", the packet processing unit 206 corrects the packet length of the ALP packet immediately before the identified packet boundary. The ALP packet immediately before the identified packet boundary corresponds to the ALP packet finally extracted in the BBP on which the error correction is unsuccessfully performed. The packet processing unit 206 corrects, for example, a packet length of the ALP packet immediately before the identified packet boundary to a packet length that does not include the identified packet boundary.

Further, when the packet length of the corrected ALP packet is not within the set range, the packet processing unit 206 does not have to extract the corrected ALP packet. The case where the packet length of the corrected ALP packet is not within the set range means a case where the data length of the corrected ALP packet is smaller than the set range. That is, the packet processing unit 206 does not extract the corrected ALP packet, for example, when the corrected ALP packet is a short packet that cannot be extracted in terms of a standard or an operation.

Therefore, the corrected ALP packet is not extracted as described above, so that it is possible to prevent the demodulation circuit 200 from outputting the ALP packet, which cannot be operationally extracted.

(5) FIFTH EXAMPLE OF PROCESSING IN PACKET PROCESSING UNIT 206

The example of the process in the case of the BBP on which the error correction is unsuccessfully performed is to be processed is limited to the process according to the second example shown in (2) above to the process according to the fourth example shown in (4) above.

For example, the packet processing unit 206 does not extract the ALP packet from the BBP on which the error correction is unsuccessfully performed.

As described above, since the ALP packet is not extracted from the BBP on which the error correction is unsuccessfully performed, it is possible to prevent the demodulation circuit 200 from outputting the ALP packet that cannot be operationally extracted.

(6) SIXTH EXAMPLE OF PROCESSING IN PACKET PROCESSING UNIT 206

The packet processing unit 206 may perform two or more processes that can be combined, among the process according to the first example shown in (1) above to the process according to the fifth example shown in (5) above.

As an example of the combination, the packet processing unit 206 performs "the process according to the first example shown in (1) above", and "any one of the process according to the second example shown in (2) above, the process according to the third example shown in (3) above, and the process according to the fifth example shown in (5) above". As another example of the combination, the packet processing unit 206, for example, performs "the process according to the first example shown in (1) above", "the process according to the second example shown in (2) above or the process according to the third example shown in (3) above", and "the process according to the fourth example shown in (4) above". It goes without saying that the example of the combination of the processes is not limited to the above examples.

Figure 7:
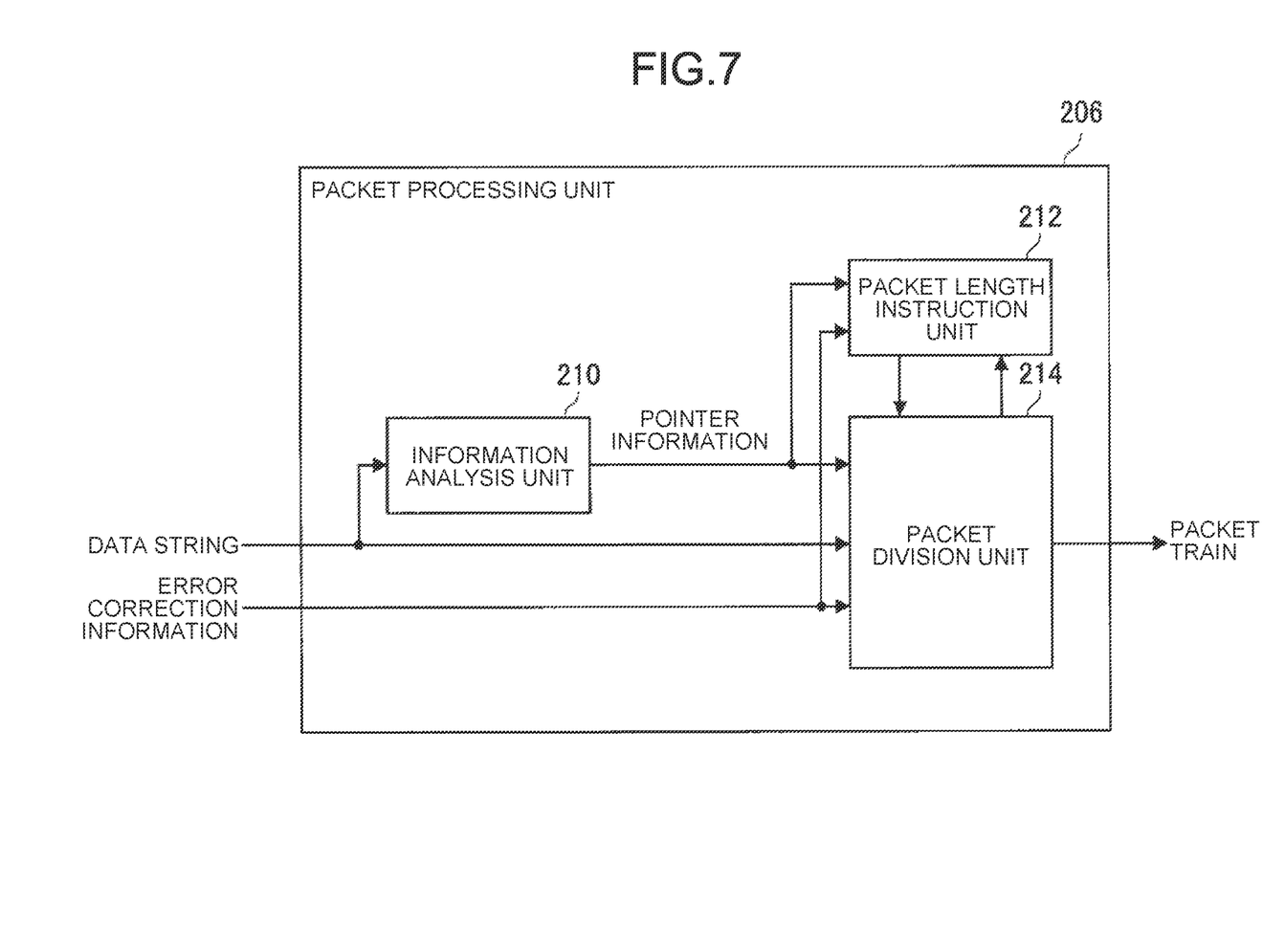
FIG. 7 is a block diagram illustrating an example of a functional configuration of a packet processing unit included in the demodulation circuit according to the present embodiment.

FIG. 7 is a block diagram illustrating an example of the functional configuration of the packet processing unit 206 included in the demodulation circuit 200 according to the present embodiment. In FIG. 7, as in FIG. 3, the BBP transmitted from the error correction processing unit 204 to the packet processing unit 206 is indicated as a "data string".

The packet processing unit 206 includes, for example, an information analysis unit 210, a packet length instruction unit 212, and a packet division unit 214.

The information analysis unit 210 extracts the pointer information from the BBP on which the error correction has been performed that is transmitted from the error correction processing unit 204. Then, the information analysis unit 210 transmits the extracted pointer information to the packet length instruction unit 212 and the packet division unit 214.

The packet length instruction unit 212 identifies the packet length of the ALP packet included in the BBP based on the BBP on which the error correction has been performed that is transmitted from the error correction processing unit 204 and the pointer information transmitted from the information analysis unit 210. For example, as described in an example of the process of extracting the ALP packet from the BBP described above, the packet length instruction unit 212 identifies the start position and the data length of the ALP packet to identify the packet length of the ALP packet. Then, the packet length instruction unit 212 transmits the packet length of the identified ALP packet to the packet division unit 214.

The packet division unit 214 extracts the ALP packet from the BBP based on the BBP on which the error correction has been performed and the error correction information which are transmitted from the error correction processing unit 204, pointer information transmitted from the information analysis unit 210, and the packet length of the ALP packet transmitted from the packet length instruction unit 212. Then, the packet division unit 214 outputs the extracted ALP packet to the processing circuit 300.

The packet division unit 214 performs any one of the process according to the first example shown in (1) to the process according to the sixth example shown in (6) described above to extract the ALP packet from the BBP.

Here, when the packet division unit 214 has a function of correcting the packet length of the ALP packet, the packet division unit 214 has, for example, a buffer that temporarily stores the ALP packet before outputting the ALP packet. Then, the packet division unit 214 corrects the packet length of the ALP packet stored in the buffer.

The packet processing unit 206 has, for example, the functional configuration illustrated in FIG. 7 to perform any one of the process according to the first example shown in (1) to the process according to the sixth example shown in (6) described above. It goes without saying that the functional configuration illustrated in FIG. 7 is obtained by dividing the functions of the packet processing unit 206 for convenience, and the functional configuration of the packet processing unit 206 is not limited to that of the example illustrated in FIG. 7.

[1-3] Processing Circuit 300

The processing circuit 300 is a circuit (or a circuit group) having a function of processing the broadcast signal demodulated by the demodulation circuit 200. For example, the processing circuit 300 processes the ALP packet output from the demodulation circuit 200.

As an example of the process on the demodulated broadcast signal, examples of the process include any processes that can be performed on the demodulated broadcast signal such as a display control process of displaying an image on the display screen of a display device, and an audio output process of outputting audio from an audio output device.

Examples of the processing circuit 300 includes "an IC chip that includes one or more processors and in which various circuits for realizing the functions of the processing circuit 300 are integrated". It goes without saying that the processing circuit 300 does not have to be realized in the form of an IC chip.

The processing device 1000 includes the reception circuit 100, the demodulation circuit 200, and the processing circuit 300 having the functions and configurations described with reference to FIGS. 1, 2, 3, 4A, 4B, 5A, 5B, 6A, 6B, and 7, for example. As described above, it goes without saying that the configuration of the processing device according to the present embodiment is not limited to the above configuration.

An example of effects exhibited by using the processing method according to the present embodiment For example, the following effects can be obtained by using the processing device including the demodulation circuit that performs the process according to the processing method according to the present embodiment. It goes without saying that the effects obtained by using the processing method according to the present embodiment are not limited to those of the examples shown below.

As described with reference to FIGS. 5A and 5B, the demodulation circuit including the packet processing unit that performs the process according to the first example shown in (1) above can return to normal without being affected by an error even when the error occurs in the process of extracting the ALP packet from the BBP.

The demodulation circuit including the packet processing unit that performs the process according to the second example shown in (2) above changes the type indicated by the ALP packet when the type indicated by the extracted ALP packet satisfies the change condition. Therefore, even when an error occurs in the process of extracting the ALP packet from the BBP, it is possible to prevent the demodulation circuit from outputting the ALP packet that cannot be operationally extracted.

The demodulation circuit including the packet processing unit that performs the process according to the third example shown in (3) above changes, for example, the type indicated by the extracted ALP packet to a predetermined type such as a type which cannot be operationally extracted. Therefore, the demodulation circuit informs a subsequent stage circuit such as a processing circuit that "the ALP packet is an error packet" (or "the ALP packet is an ALP packet obtained from the BBP that is not normal data").

[3] An Application Example of the Processing Device According to the Present Embodiment Although the processing device is described as the present embodiment, the present embodiment is not limited to this. The processing device according to the present embodiment can be applied to any device capable of processing the acquired broadcast signal, such as, for example, a "TV receiver", a "set top box", a "smartphone", a "computer such as a personal computer (PC)", a "tablet type device", a "game machine", or "any mobile body such as an automobile". Further, the processing device according to the present embodiment can also be applied to, for example, an IC or a large scale integration (LSI) that can be incorporated in the above-described devices.

Program According to the Embodiment

A program for causing a computer to function as the demodulation circuit according to the present embodiment (for example, a program capable of realizing the functions of the demodulation unit 202, the error correction processing unit 204, and the packet processing unit 206 as illustrated in FIG. 3) is executed by a processor or the like in a computer, so that robustness in demodulating a broadcast signal can be improved.

In addition, a program for causing a computer to function as the demodulation circuit according to the present embodiment is executed by a processor or the like in the computer, so that the effects produced by the example of the process in the demodulation circuit (example of the process in the packet processing unit) described above can be obtained.

The preferred embodiments of the present disclosure have been described in detail with reference to the accompanying drawings, but the technical scope of the present disclosure is not limited to such examples. It is obvious that those who are skilled in the art in the technical field of the present disclosure can find various revisions and modifications within the scope of a technical concept described in claims, and it should be understood that these revisions and modifications will also be naturally come under the technical scope of the present disclosure.

For example, in the above, while it has been shown that a program (computer program) for causing a computer to function as the demodulation circuit according to the present embodiment is provided, the embodiment can also provide a recording medium in which the above program is stored.

The above-described configuration shows an example of the present embodiment and, of course, belongs to the technical scope of the present disclosure.

Furthermore, the effects described in the present specification are merely illustrative or exemplified effects, and are not limitative. That is, the technology according to the present disclosure can accomplish other effects apparent to those skilled in the art from the description of the present specification, in addition to or instead of the effects described above.

Note that the following configurations also belong to the technical scope of the present disclosure.

(1) A demodulation circuit comprising:
- a demodulation unit that demodulates a broadcast signal received by a reception circuit that receives the broadcast signal;
- an error correction processing unit that performs an error correction on a first packet obtained by demodulation; and
- a packet processing unit that extracts a second packet from the first packet on which an error correction has been performed, wherein
- when an error correction is unsuccessfully performed on the first packet that was to be processed immediately before, the packet processing unit extracts the second packet from the first packet to be processed based on pointer information included in the first packet to be processed.

(2) The demodulation circuit according to (1), wherein the packet processing unit
- identifies a start position and a data length of a first located packet of a plurality of the second packets based on the pointer information to extract the first located packet of the second packets,
- identifies a start position and a data length of a second located packet of the second packets based on the start position and the data length of the first located packet of the second packets to extract the second located packet of the second packets, and
- identifies, every time a start position and a data length of a packet of the second packets are identified, a start position and a data length of a next packet of the second packets to extract a packet, of the second packets, corresponding to the identified start position and the identified data length.

(3) The demodulation circuit according to (2), wherein when an identified data length is not within a set range, the packet processing unit corrects the identified data length to a data length within the range.

(4) The demodulation circuit according to (3), wherein the packet processing unit corrects an identified data length to a data length corresponding to a learning result of a data length of the second packet extracted from the first packet on which an error correction is successfully performed.

(5) The demodulation circuit according to any one of (1) to (4), wherein when the first packet on which an error correction is unsuccessfully performed is to be processed, the packet processing unit changes, based on a type indicated by the extracted second packet and a change condition that is set, the type in a selective manner.

(6) The demodulation circuit according to (5), wherein the packet processing unit changes a type indicated by the extracted second packet to a type corresponding to a learning result of a type indicated by the second packet extracted from the first packet on which an error correction is successfully performed.

(7) The demodulation circuit according to (5) or (6), wherein the packet processing unit sets the second packet in which the type has been changed to a packet having a data length corresponding to the changed type.

(8) The demodulation circuit according to any one of (1) to (4), wherein when the first packet on which an error correction is unsuccessfully performed is to be processed, the packet processing unit changes, based on a type indicated by the extracted second packet and a change condition that is set, a header of the extracted second packet in a selective manner.

(9) The demodulation circuit according to (8), wherein the packet processing unit changes a header of the extracted second packet to a header corresponding to a learning result of a header of the second packet extracted from the first packet on which an error correction is successfully performed.

(10) The demodulation circuit according to any one of (1) to (4), wherein when the first packet on which an error correction is unsuccessfully performed is to be processed, the packet processing unit changes a type indicated by the extracted second packet to a predetermined type.

(11) The demodulation circuit according to any one of (5) to (10), wherein when the first packet on which an error correction is unsuccessfully performed is to be processed, the packet processing unit corrects a packet length of the second packet that is finally extracted in the first packet on which an error correction is unsuccessfully performed based on a start position of the second packet identified based on the pointer information included in the first packet to be processed next.

(12) The demodulation circuit according to (11), wherein the packet processing unit does not extract the corrected second packet when a packet length of the corrected second packet is not within a set range.

(13) The demodulation circuit according to any one of (1) to (4), wherein the packet processing unit does not extract a second packet from the first packet when the first packet on which an error correction is unsuccessfully performed is to be processed.

(14) The demodulation circuit according to any one of (1) to (13), wherein the second packet is a variable-length packet.

(15) The demodulation circuit according to any one of (1) to (14), wherein
- the first packet is a baseband packet (BBP) conforming to an advanced television systems committee (ATSC) 3.0 standard, and
- the second packet is an ATSC link-layer protocol (ALP) packet conforming to the ATSC 3.0 standard.

(16) A processing method executed by a demodulation circuit, the method comprising:

a step of demodulating a broadcast signal received by a reception circuit that receives the broadcast signal;
a step of performing an error correction on a first packet obtained by demodulation; and
a step of extracting a second packet from the first packet on which an error correction has been performed, wherein
in the extracting step, when an error correction is unsuccessfully performed on the first packet that was to be processed immediately before, the second packet is extracted from the first packet to be processed based on pointer information included in the first packet to be processed.

(17) A processing device comprising:
a reception circuit that receives a broadcast signal;
a demodulation circuit electrically connected to the reception circuit; and
a processing circuit electrically connected to the demodulation circuit, wherein
the demodulation circuit includes
a demodulation unit that demodulates the broadcast signal received by the reception circuit,
an error correction processing unit that performs an error correction on a first packet obtained by demodulation, and
a packet processing unit that extracts a second packet from the first packet on which an error correction has been performed, and
when an error correction is unsuccessfully performed on the first packet that was to be processed immediately before, the packet processing unit extracts the second packet from the first packet to be processed based on pointer information included in the first packet to be processed.

REFERENCE SIGNS LIST

100 RECEPTION CIRCUIT
200 DEMODULATION CIRCUIT
202 DEMODULATION UNIT
204 ERROR CORRECTION PROCESSING UNIT
206 PACKET PROCESSING UNIT
300 PROCESSING CIRCUIT
1000 PROCESSING DEVICE

The invention claimed is:

1. A demodulation circuit comprising:
a demodulation unit that demodulates a broadcast signal received by a reception circuit that receives the broadcast signal;
an error correction processing unit that performs an error correction on a first packet obtained by demodulation; and
a packet processing unit that extracts a second packet from the first packet on which the error correction has been performed, wherein
when an error correction is unsuccessfully performed on the first packet that was to be processed immediately before, the packet processing unit extracts the second packet from the first packet to be processed based on pointer information included in the first packet to be processed.

2. The demodulation circuit according to claim 1, wherein the packet processing unit
identifies a start position and a data length of a first located packet of a plurality of the second packets based on the pointer information to extract the first located packet of the second packets,
identifies a start position and a data length of a second located packet of the second packets based on the start position and the data length of the first located packet of the second packets to extract the second located packet of the second packets, and
identifies, every time a start position and a data length of a packet of the second packets are identified, a start position and a data length of a next packet of the second packets to extract a packet, of the second packets, corresponding to the identified start position and the identified data length.

3. The demodulation circuit according to claim 2, wherein when an identified data length is not within a set range, the packet processing unit corrects the identified data length to a data length within the range.

4. The demodulation circuit according to claim 3, wherein the packet processing unit corrects an identified data length to a data length corresponding to a learning result of a data length of the second packet extracted from the first packet on which the error correction is successfully performed.

5. The demodulation circuit according to claim 1, wherein when the first packet on which the error correction is unsuccessfully performed is to be processed, the packet processing unit changes, based on a type indicated by the extracted second packet and a change condition that is set, the type in a selective manner.

6. The demodulation circuit according to claim 5, wherein the packet processing unit changes a type indicated by the extracted second packet to a type corresponding to a learning result of a type indicated by the second packet extracted from the first packet on which the error correction is successfully performed.

7. The demodulation circuit according to claim 5, wherein the packet processing unit sets the second packet in which the type has been changed to a packet having a data length corresponding to the changed type.

8. The demodulation circuit according to claim 1, wherein when the first packet on which the error correction is unsuccessfully performed is to be processed, the packet processing unit changes, based on a type indicated by the extracted second packet and a change condition that is set, a header of the extracted second packet in a selective manner.

9. The demodulation circuit according to claim 8, wherein the packet processing unit changes a header of the extracted second packet to a header corresponding to a learning result of a header of the second packet extracted from the first packet on which the error correction is successfully performed.

10. The demodulation circuit according to claim 1, wherein when the first packet on which the error correction is unsuccessfully performed is to be processed, the packet processing unit changes a type indicated by the extracted second packet to a predetermined type.

11. The demodulation circuit according to claim 5, wherein when the first packet on which an error correction is unsuccessfully performed is to be processed, the packet processing unit corrects a packet length of the second packet that is finally extracted in the first packet on which the error correction is unsuccessfully performed based on a start position of the second packet identified based on the pointer information included in the first packet to be processed next.

12. The demodulation circuit according to claim 11, wherein the packet processing unit does not extract the corrected second packet when a packet length of the corrected second packet is not within a set range.

13. The demodulation circuit according to claim 1, wherein the packet processing unit does not extract a second packet from the first packet when the first packet on which the error correction is unsuccessfully performed is to be processed.

14. The demodulation circuit according to claim 1, wherein the second packet is a variable-length packet.

15. The demodulation circuit according to claim 1, wherein
the first packet is a baseband packet (BBP) conforming to an advanced television systems committee (ATSC) 3.0 standard, and
the second packet is an ATSC link-layer protocol (ALP) packet conforming to the ATSC 3.0 standard.

16. A processing method executed by a demodulation circuit, the method comprising:
demodulating a broadcast signal received by a reception circuit that receives the broadcast signal;
performing an error correction on a first packet obtained by demodulation; and
extracting a second packet from the first packet on which the error correction has been performed, wherein
in the extracting, when the error correction is unsuccessfully performed on the first packet that was to be processed immediately before, the second packet is extracted from the first packet to be processed based on pointer information included in the first packet to be processed.

17. A processing device comprising:
a reception circuit that receives a broadcast signal;
a demodulation circuit electrically connected to the reception circuit; and
a processing circuit electrically connected to the demodulation circuit, wherein
the demodulation circuit includes
a demodulation unit that demodulates the broadcast signal received by the reception circuit,
an error correction processing unit that performs an error correction on a first packet obtained by demodulation, and
a packet processing unit that extracts a second packet from the first packet on which the error correction has been performed, and
when the error correction is unsuccessfully performed on the first packet that was to be processed immediately before, the packet processing unit extracts the second packet from the first packet to be processed based on pointer information included in the first packet to be processed.

\* \* \* \* \*